UNITED STATES PATENT OFFICE.

AUGUSTUS MORRIS AND JAMES AUGUSTUS PARKER, OF SYDNEY, NEW SOUTH WALES.

PRESERVATIVE COATING FOR FOODS.

SPECIFICATION forming part of Letters Patent No. 556,471, dated March 17, 1896.

Application filed July 10, 1895. Serial No. 555,546. (No specimens.)

*To all whom it may concern:*

Be it known that we, AUGUSTUS MORRIS and JAMES AUGUSTUS PARKER, of Sydney, in the Colony of New South Wales, have invented certain new and useful Improvements in Means for Preserving Fruit, Vegetables, Meats, &c.; and we do hereby declare the following to be a full, clear, and exact description of the invention, such as will enable others skilled in the art to which it appertains to make and use the same.

Our invention relates to an improvement in means for preserving fruit, vegetables, meats, cheese, eggs, confectionery, and other vegetable or animal matter, the object of the invention being to envelop the fruit or other article in an artificial skin or coating to prevent the access of germs from the air, which germs, if permitted to penetrate the natural skin of the food, would set up putrefactive fermentation.

A further object is to prevent the evaporation of the water from the juices of the fruit and prevent shriveling and toughening.

A further object is to prevent oxidation and consequent rancidity of ham and bacon.

A further object is to stop evaporation and early decay in cheese.

A further object is to close the pores of the shells of eggs, so that no evaporation nor absorption of oxygen or other external injurious agent can take place.

With these objects in view the invention consists in certain combinations of ingredients for forming an artificial skin or coating on fruit, &c., substantially as hereinafter set forth, and pointed out in the claims.

In carrying our invention into effect we dip the fruit or other food into a solution of such materials as will leave a tough elastic coating or artificial skin after the solvent shall have evaporated, or the fruit or other article can be coated with the solution by means of a brush or in any other desired manner.

Our improved solution is composed of water, gelatine, (best,) dextrine, borax, glycerine, and unmethylated spirits of wine.

In making the solution the proportions are as follows: one hundred and sixty ounces (one English gallon) water, ten ounces best gelatine, ten ounces dextrine, two and one-half ounces borax, two drops of glycerine to each fluid ounce of the solution, and two and one-half ounces pure spirits of wine to the whole solution.

In making the solution the gelatine, borax and dextrine should be soaked in cold water (one hundred and sixty ounces) until the gelatine becomes soft and then the ingredients should be warmed up to a temperature of 180° Fahrenheit, when the gelatine, dextrine and borax will be dissolved, and when dissolved add to each fluid ounce of the solution two drops of glycerine and to the whole solution two and a half ($2\frac{1}{2}$) ounces pure spirits of wine. The solution should then be shaken or stirred up, so that all the ingredients may be thoroughly mixed. After this has been done the solution should be strained to remove any undissolved particles, and then it will be fit for use.

At temperatures below 80° or 85° Fahrenheit the ingredients form a jelly, so that before they are fit for use they should be warmed to a temperature of 100° Fahrenheit.

This solution is well adapted for the preservation of eggs and for the preservation of fruits having smooth skins, and especially for the preservation of grapes.

All articles covered with the solution must be thoroughly dried before they are packed, and in respect to grapes, after being dipped in the solution, they should be absolutely dried in the sun or in a heated room and then placed in paper bags and packed in boxes with a nonabsorbent material. After the grapes have been dipped it is desirable that they should be subjected to centrifugal action to prevent drops of the solution forming into nodules. It would be well to subject the dipped grapes to a warm blast, so that it may be certain that they shall be dry when they touch one another.

It is better to pack treated eggs small ends downward, so that their yolks may not be displaced.

The artificial skin resulting from the solution is quite transparent and remarkably tough and elastic. It will be useless to treat with the solution any other than newly-laid eggs and fruit free from the slightest bruise. Besides dipping in the solution or painting with a brush, a very rapid method of coating eggs or hard smooth fruit is by rubbing the solution on with the hands. A boy or girl can so treat two thousand eggs a day. Hams, bacon and cheese covered with cheese-cloth or other envelope should be dipped in the solution and thoroughly dried. Warm water will remove the coating.

Having fully described our invention, what we claim as new, and desire to secure by Letters Patent, is—

1. A compound for forming a preserving coating, skin or envelope consisting of water, a glutinous matter, borax, spirit and glycerine, in substantially the proportions herein specified.

2. A compound for forming a preserving coating, skin or envelope consisting of water, spirit, borax, gelatine, dextrine and glycerine in substantially the proportions stated.

In testimony whereof we have signed this specification in the presence of two subscribing witnesses.

AUGUSTUS MORRIS.
JAMES AUGUSTUS PARKER.

Witnesses:
ALICE ELIZABETH MILLER,
W. H. DAWSON.